Patented Oct. 10, 1950

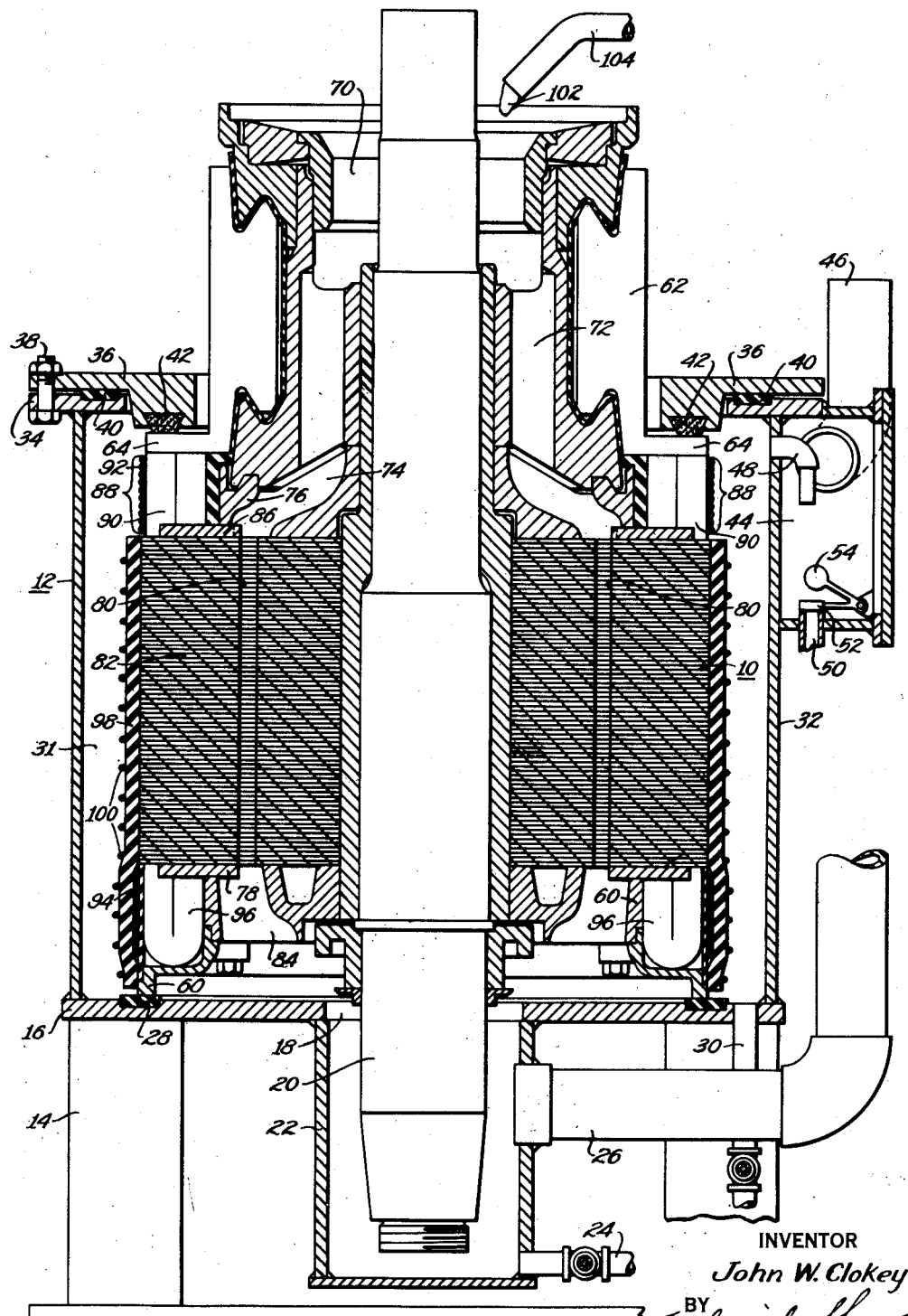

2,524,885

UNITED STATES PATENT OFFICE 2,524,885

VARNISH TREATMENT FOR ROTORS

John W. Clokey, Pittsburgh, Pa., assignor to Westinghouse Electric Corporation, East Pittsburgh, Pa., a corporation of Pennsylvania Application April 16, 1947, Serial No. 741,892

5 Claims. (Cl. 117—113)

This invention relates to the impregnating of electrical apparatus with insulating varnishes.

In the manufacture of electrical apparatus, and particularly rotors, it is desirable to treat the electrical windings and magnetic core with an insulating varnish, which when baked, provides a hard insulating resinous impregnant filling the interstices in the windings as solidly as possible thereby more effectively insulating them from one another. The varnish treatment is intended to protect the electrical windings from the effects of moisture, dust, corrosive gases and other external influences that might cause a premature breakdown and failure of the electrical rotor. The varnish treatment not only coats the windings with an impervious layer of resin but also fills in spaces and thereby prevents lodging or entry of dust, water, and other deleterious matter.

The customary varnish impregnating treatment consists in placing an electrical member, such as a coil, magnetic core or the like, in a tank and evacuating it to remove air to minimize any restriction to varnish penetration into the capillary interstices of the member and then introducing an electrically fluid insulating varnish into the tank to a depth sufficient to cover or submerge the portions desired to be impregnated. The insulating varnish thus applied flows from exterior surfaces into the interstices of the magnetic core and windings. The force causing flow of the varnish is mainly its hydrostatic pressure. However, the resistance of capillary spaces to the pentration of insulating varnish is especially great and in many cases deep-seated portions of the windings may receive little varnish. In any event the amount of varnish present diminishes with the distance from the exterior surface for windings not freely open to the surface. In some cases, relatively unvarnished interior portions have been discovered upon tearing down the windings. Superimposing gas pressure on the varnish is not as successful as would be expected because the gas will penetrate into the interstices more readily than the varnish and balances itself. Even a number of successive impregnations with intermediate baking to harden or cure the varnish often fails to produce an adequate varnish impregnation of all the windings.

In some cases the cooling of electrical rotors during operation is accomplished by forcing air through internal passageways present behind the commutator and extending through the magnetic core. The air flowing through these passageways may be laden with moisture and dust, often including carbon dust from the brushes, and when subjected to the centrifugal action during operation of the rotors, the dust is driven into any internal interstices or other aperatures present, thereby forming a conductive bridge between the windings. Unfortunately it is these internal portions of the windings that have been relatively poorly varnish impregnated and lack the usually desired amount of protective insulating varnish. Failures have occurred from the combination of inadequate varnish insulation and excessive accumulation of conductive dusts.

The object of this invention is to provide for thoroughly and completely impregnating rotors of dynamo-electric machines with insulating varnishes.

A further object of this invention is to impregnate a rotor of a dynamo-electric machine with insulating varnish by forcing under positive pressure the varnish internally through the electrical elements to the external surfaces, thereby applying an adequate amount of varnish on the internal portions of the electrical members.

A still further object of the invention is to impregnate dynamo-electric rotors by first applying insulating varnish internally and then externally, thereby insuring thorough impregnation and insulation.

Other objects of the invention will, in part, be obvious and will, in part, appear hereinafter. For a fuller understanding of the nature of the invention, reference should be had to the following detailed description and drawing in which the single figure is a cross-sectional view in elevation illustrating the practice of the invention.

According to the present invention, rotors of electrical machines are treated with electrically insulating varnish by introducing the varnish internally and forcing the varnish under considerable pressure to pass through the electrical windings and magnetic core to the exterior surfaces of the rotor, thereby assuring an adequate treatment of the windings and magnetic core with the varnish within the interior portions thereof. Before or after baking, the rotor may be treated externally with varnish as by conventional practice, thereby assuring that the exterior portions of the windings also will be adequately impregnated with the insulating varnish. Furthermore, the present invention enables the successful varnish impregnation of the windings up to the commutator risers which has not been possible heretofore by conventional treatment.

The practice of the present invention makes use of the internal cooling air passages ordinarily present in electrical rotors. In some cases, it may be necessary to drill or otherwise form or design suitable passageways through the magnetic core behind the electrical windings for the satisfactory practice of the invention.

Referring to the figure of the drawing, there is illustrated the practice of the process of the present invention as applied to rotor or armature 10, such for example, as may be employed in railway drive motors. The armature 10 is placed within a varnish impregnating tank 12 especially designed to cooperate with the armature for the carrying out of the present invention. However, other forms of suitable apparatus have been made and found to function satisfactorily. The impregnating tank 12 comprises a supporting base 14 upon which is mounted a base plate 16 provided with a central aperture 18 for the projection therethrough of the end of shaft 20 of the armature. A sealed well 22 is provided to contain the end of the shaft 20. A valved conduit 24 is connected at the bottom of the well 22 for removing or draining off varnish that may accumulate in the well. A pipe 26 also connected to the well 22 is provided for filling the tank 12 with varnish or for taking care of any overflow that may occur. The base plate 16 is provided with a gasket 28 of synthetic rubber or cork composition suitable for forming a hermetic seal with the end frame 60 of the rotor. A second valved conduit 30 located near the periphery of the base plate 16 is provided for withdrawing varnish from the chamber 31 of the apparatus defined by the portion of the base plate beyond the gasket 28, the exterior of the armature 10, and an external shell 32. The external shell 32, as well as the well 22, may be welded or otherwise affixed air-tightly to the base plate 16. At the upper end of the shell 32 there is attached, as by welding, a flange 34 to which there may be fastened by bolts 38 an apertured cover 36. A suitable packing 40 of synthetic rubber or cork composition may be provided in flange 34 to secure a hermetic seal with the cover 36. The cover 36 is provided with a second gasket 42 capable of forming a hermetic seal when in contact with the commutator riser 64 of the commutator 62 of the armature.

Attached to one side of the shell 32 of the apparatus is a vacuum chamber 44 connected by a suitable vacuum conduit 46 to a vacuum pump or other source of reduced pressure. An elbow 48 provides for the withdrawal of air from the interior of the tank 12 to the vacuum chamber 44. In case some varnish may pass through the elbow 48 into the chamber 44 and accumulates to a predetermined level at the bottom thereof, a valve 52 and associated float 54 operating in conjunction with an overflow pipe 56 will operate to let the varnish vent by gravity to a larger receptacle (not shown) maintained at the same pressure as the chamber 44.

In varnish impregnation of rotors with assembled commutators, it is quite critical to prevent any penetration of the varnish into the commutator proper, such as the commutator 62 in the armature illustrated. The reason for this is that during the building-up of the commutator and its insulation it is assembled quite precisely under pressure and, if varnish penetrates into the insulation between the commutator segments, upon drying and curing, the commutator insulation will swell, usually unevenly, and be distorted. Satisfactory commutator operation will be almost impossible thereafter. The risers 64 of the commutator, however, are not subject to this infirmity and if varnish enters the risers, it is not objectionable and may be beneficial. The tank 12 is so constructed and associated with the armature 10 as to permit varnish to reach only the risers 64 but not to penetrate into the commutator 62.

The armature 10 has a series of internal connected passageways for passing cooling air therethrough. These passageways comprise an inlet passage 70, at the commutator or "front" end of the armature, a second passage 72 behind the commutator proper and an inclined passage 74 in a front end frame 76 immediately behind the front diamond portion 88, and a plurality of small internal cooling passages 80 in the magnetic core 82 and an outlet 84 in the rear end frame 60.

The passages 70 and 72 are so arranged that no radial apertures to the exterior are present. Inclined passage 74 however does have radial access to the exterior through a front finger plate 86. The finger plate 86 has slots corresponding to the usual slots in the core 82 accommodating the windings. The front end frame 76 overlaps the slots in the finger plate 86 thereby providing channels leading to the front diamond portion 88. The front diamond comprises insulated conductor or winding terminals 90 which are soldered or brazed to the commutator riser 64, and banding wire 92 applied in a compact layer over the winding terminals 90.

By reason of the unevenness of the laminae forming core 82, many fine capillary spaces extend from the passages 80 to the exterior of the core and to the slots in which the windings are disposed.

A rear finger plate 78 constructed and arranged similarly to the front finger plate 86, permits access from outlet 84 to the rear diamond portion 94 comprising end windings 96.

In order to insure full and thorough impregnation of the rear diamond portion 94, the core 82 and associated slot insulation and windings, and the front diamond portion 88 up to the risers 64, a sleeve 98 of an elastomeric material such as rubber, polychlorobutadiene or the like may be slipped over the armature 10 to cover the core 82 and the rear diamond 94. Reinforcing banding 100 of wire applied at intervals ½ inch or less may be wrapped thereon. The purpose of the sleeve 98 is to confine the varnish so as to prevent its oozing out at the lower diamond portion or core, and to cause it to travel to the upper diamond portion.

In varnish treating the armature 10 with the applied sleeve 98, it is placed within the shell 32 of the impregnating tank 12, the end frame 60 resting against gasket 28. The cover 36 is bolted in place so that the second gasket 42 is forced tightly against the riser 64. By this means there is, in effect, provided the enclosed chamber 31 between the exterior of the rotor and the shell 32. Also, it will be seen that there is a continuous series of connected internal passages 70, 72, 74, 80 and 84 leading to the opening 18 in the base plate 16. Upon air being evacuated from chamber 31 through the conduit 46, chamber 44 and elbow 48, there is set up a differential pressure between the chamber 31 and the connected passages. A vacuum of from 20 to 28 inches of mercury has given good results. The passages may be exposed to the free atmosphere. If desired, superatmospheric pressure may be applied to the passages.

Thereafter, varnish 102 applied through a hose or tube 104 is poured into the inlet passage 70 from which it flows readily through the passage 72 into the inclined passage 74. At this point the differential pressure becomes effective and the varnish is forced around the finger plate 86 into the upper diamond portion 80 and reaches the riser 64. The compact layer of banding wire 92 applied about the diamond portion would greatly restrict the penetration of varnish from the exterior into the diamond portion in conventional varnish tank treatment. However, in the present apparatus varnish readily penetrates from the interior passage 74 into the windings and even into the interstices in the risers 64 and builds up behind the banding wire 86. Oozing to the exterior of the diamond portion will eventually take place as all the spaces are filled.

The varnish further flows into the internal cooling passages 80 in the magnetic core 82. The varnish will be forced from the passages 80 into the fine capillary spaces between laminae to the slots in which the windings are placed and will cover and impregnate the interior or back surface of the windings and slot cell insulation. The varnish also will reach the exterior surfaces of the magnetic core. There the sleeve 98 will prevent further exudation and the varnish will begin to travel up the slots to the front diamond portion 88.

The varnish will reach the outlet 84 where it will be forced into the apertures in the finger plate 78 and thus will impregnate the rear diamond 94. Once the rear diamond portion is filled the varnish will be forced upwardly by the confining action of sleeve 98. The vacuum varnish impregnating treatment may be continued for several hours.

The use of the sleeve 98 has produced the best and most thorough impregnation possible. Armatures so prepared and treated as disclosed were found to be solidly filled. Results almost as good, and superior to ordinary treatment, have been secured on rotors treated in tank 10 without the use of the sleeve 98. In this latter case, it was found that while the insulating varnish will exude most abundantly and soonest through the larger interstices of the rotor, in time the smaller interstices, such as the interlaminar spaces in the core, will begin to exude a small amount of varnish at the exterior surfaces, thereby indicating thorough internal impregnation.

In both forms of treatment, with 6 to 24 hours treatment, large rotors of 12" to 24" in diameter have been found to be very thoroughly saturated and impregnated with the varnish from the interior portions to the exterior. The diamond portions will be entirely filled with varnish.

If desired, to enhance and expedite varnish penetration, a sealing cap may be applied over the end of the rotor to confine the passage 70 and positive air or gas pressure of the order of 10 to 100 lbs. per square inch may be applied to a supply of varnish 102 in the internal passages to drive the varnish with more pressure through the armature.

After suitable impregnation, excess varnish may be drained from well 22 and chamber 31 by ceasing evacuation and opening the conduits 24 and 30. The armature 10 may be removed from the tank 12 permitted to drain for a short period of time and baked in an oven to evaporate the varnish solvent and to cure the varnish. The treatment may be repeated to insure most complete filling of the internal portions of the core and windings.

In order to impregnate the armature from the exterior to seal all the outer surfaces thereof, as well as to fill all the interstices, varnish is introduced by the conduit 30 into the chamber 31 under pressure. This may be accomplished after the internal application of varnish has been baked. In some cases the exterior and interior application of varnish may succeed one another without an intervening baking.

For the practice of the present invention the term "varnish" will be understood to apply to any fluid insulating composition. Thus, there may be employed asphaltic varnishes, with or without solvents. Good results have been obtained by using varnishes composed of mixtures of phenolic resin with oil modified glycerol phthalate resins. The latter composition may be dissolved in a suitable solvent such as toluene, ethanol or petroleum hydro-carbon fractions having a boiling range of from 130° C. to 200° C. The varnish may contain from 20% to 60% resin solids depending upon the desired viscosity and degree of filling desired. In some cases there may be applied completely reactive compositions such as an unsaturated alkyd resin dissolved in a monomer having a $H_2C=C<$ group. Silicate gels and inorganic pastes may be applied by the process disclosed herein.

While the impregnating apparatus shown has been found to be quite satisfactory for the practice of the invention, conventional varnish impregnating tanks with slight modification may be employed. In that case, the outlet 84 should be plugged and the armature 10 drawn tightly against a perforated cover similar to 36. The varnish impregnating tank may be evacuated and then the varnish applied as described herein and shown in the drawing.

The advantage of the present invention resides in the fact that a pressure of from 5 to 14 or more pounds per square inch is exerted on the varnish in the internal passages thereby driving it into fine capillary spaces. Furthermore the continuous vacuum applied to chamber 31 continues exhausting air, moisture, solvent vapors during the varnish treatment. No other known process combines these features.

The present process can be applied to rotors with no outlets in the rear end frame as long as there are internal passages behind the windings and means providing access of the varnish thereto.

Furthermore the rotor can be preheated before varnish is introduced thereto. The temperature may be up to 350° F. or even higher. This will cause solvent to evaporate and be removed by the vacuum, leaving solid varnish behind.

Since certain changes may be made in the above invention and different embodiments of the invention may be made without departing from the scope thereof, it is intended that all matter contained in the disclosure shall be interpreted as illustrative and not in a limiting sense.

I claim as my invention:

1. In the method of varnish impregnating a rotor of an electrical machine having a magnetic core, insulated windings applied to the exterior portions of the magnetic core, both the magnetic core and windings having interstices extending to the exterior of the rotor, a commutator having risers connected to the windings and internal passages extending behind the commutator and risers and through the magnetic core, the steps comprising positioning the rotor within a sealable tank, providing a hermetic seal between the risers of the rotor and the tank, providing a hermetic seal between the tank and the end frame of the rotor opposite to the risers thereby to provide a space between the exterior of the rotor and the tank, introducing a fluid insulating varnish into the internal passages and applying a higher pressure to the insulating varnish in the internal passages than is present within the said space at the exterior portions of rotor between the risers and the end frame whereby to force the fluid insulating varnish through the interstices to the exterior of the rotor thereby impregnating and filling the interstices of the magnetic core and insulated windings interiorly.

2. In the method of varnish impregnating a rotor of an electrical machine having a magnetic core, insulated windings applied to the exterior portions of the magnetic core, both the magnetic core and windings having interstices extending to the exterior of the rotor, a commutator having risers connected to the windings and internal passages extending behind the commutator and risers and through the magnetic core, the steps comprising positioning the rotor within a sealable tank, providing a hermetic seal between the risers of the rotor and the tank, providing a hermetic seal between the tank and the end frame of the rotor opposite to the risers thereby to provide a space between the exterior of the rotor and the tank, introducing a fluid insulating varnish into the internal passages, applying a higher pressure to the insulating varnish in the internal passages than is present at the exterior portions of the risers and magnetic core whereby to force the fluid insulating varnish through the interstices to the exterior of the rotor thereby impregnating and filling the interstices of the magnetic core and insulated windings interiorly, thereafter applying insulating varnish to the exterior of the rotor to impregnate and fill exterior interstices.

3. In the method of varnish impregnating a rotor of an electrical machine having a magnetic core insulated windings applied to the exterior portions of the magnetic core, both the magnetic core and windings having interstices extending to the exterior of the rotor, a commutator having risers connected to the windings and internal passages extending behind the commutator and risers and through the magnetic core, the steps comprising positioning the rotor within a sealable tank, providing a hermetic seal between the risers of the rotor and the tank, providing a hermetic seal between the tank and the end frame of the rotor opposite to the risers thereby to provide a space between the exterior of the rotor and the tank, introducing a fluid insulating varnish into the internal passages and applying a vacuum to the said space about the exterior portion of the rotor whereby atmospheric pressure forces the fluid insulating varnish by the differential pressure through the interstices to the exterior of the rotor thereby impregnating and filling the interstices of the magnetic core and insulated windings interiorly.

4. In the method of varnish impregnating a rotor of an electrical machine having a magnetic core, insulated windings applied to the exterior portions of said magnetic core, both the magnetic core and windings having interstices extending to the exterior of the rotor, a commutator having risers connected to the windings and internal passages extending behind the commutator and risers and through the magnetic core, the steps comprising applying a confining sleeve to the outer peripheral surface of both the core and winding but leaving an uncovered space below the risers, introducing a fluid insulating varnish into the internal passages and applying a higher pressure to the insulating varnish in the internal passages than is present at the exterior portions of the risers and magnetic core whereby to force the fluid insulating varnish through the interstices to the exterior of the rotor, the confining sleeve controlling exudation and securing thorough impregnation and filling the interstices of the magnetic core and insulated windings interiorly.

5. In the method of applying a varnish to a rotor of an electrical machine comprising a winding and a magnetic core having internal passages, the winding and magnetic core having interstices finer than the internal passages, the interstices extending from the passages to the exterior of the rotor, the steps comprising applying a confining sleeve to the outer peripheral surface of the rotor to cover only the coil and core, but leaving an uncovered space below the risers, introducing the varnish into the internal passages, applying a subatmospheric pressure to the exterior of the rotor whereby a positive pressure difference between the exterior of the rotor and the varnish in the internal passages is established to force varnish into the interstices of the rotor, to the exterior of the rotor, and to the confining sleeve, and thereafter applying insulating varnish to the exterior of the rotor by immersing it in varnish.

JOHN W. CLOKEY.

REFERENCES CITED

The following references are of record in the file of this patent:

UNITED STATES PATENTS

| Number | Name | Date |
|---|---|---|
| 691,600 | Coates | Jan. 21, 1902 |
| 1,270,969 | Parker | July 2, 1918 |
| 1,902,575 | Nichols | Mar. 21, 1933 |
| 2,417,851 | Young | Mar. 25, 1947 |
| 2,430,224 | Green et al. | Nov. 4, 1947 |